United States Patent [19]

Schreier et al.

[11] Patent Number: 4,554,041

[45] Date of Patent: Nov. 19, 1985

[54] METHOD OF PRODUCING A THERMALLY INSULATED BODY

[75] Inventors: Kurt Schreier, Breitenfurt; Karl Bartsch, Vienna; Helmut Knoll, Mürzhofen; Gerd Tomazic, Mürzzuschlag, all of Austria

[73] Assignee: Vereinigte Edelstahlwerke Aktiengesellschaft, Vienna, Austria

[21] Appl. No.: 604,616

[22] PCT Filed: Aug. 17, 1983

[86] PCT No.: PCT/AT83/00025

§ 371 Date: Apr. 12, 1984

§ 102(e) Date: Apr. 12, 1984

[87] PCT Pub. No.: WO84/00798

PCT Pub. Date: Mar. 1, 1984

[30] Foreign Application Priority Data

Aug. 20, 1982 [AT] Austria ............................. 3165/82

[51] Int. Cl.[4] ............................................ B32B 31/06
[52] U.S. Cl. ................................ 156/276; 138/149;
156/286; 156/292; 220/422; 228/60
[58] Field of Search ............... 138/149; 156/276, 286,
156/292; 220/422; 228/60

[56] References Cited

U.S. PATENT DOCUMENTS 4,208,232 6/1980 Wagner ........................ 220/422 X
4,349,051 9/1982 Schilf ................................ 138/149

FOREIGN PATENT DOCUMENTS 17095 10/1980 European Pat. Off. .
2114046 10/1972 Fed. Rep. of Germany .
2333933 1/1974 Fed. Rep. of Germany .
2750457 6/1978 Fed. Rep. of Germany .
3034468 9/1981 Fed. Rep. of Germany .
1096430 12/1967 United Kingdom .
1286076 8/1972 United Kingdom .

Primary Examiner—Robert A. Dawson
Attorney, Agent, or Firm—Werner W. Kleeman

[57] ABSTRACT

The use of thermally insulated bodies is determined by their insulative properties, on the one hand, and by the economy of their fabrication on the other hand. A particularly simple method for manufacturing a thermally insulated body, e.g. a pipe, with inner and outer shells, especially with metallic inner and outer shells, forming an intermediate space which is filled with porous particulate and/or porous powdered insulating material, evacuated and hermetically sealed consists in first evacuating the intermediate space between the inner and outer shell, maintaining the space under vacuum and then introducing the insulating material from a reservoir maintained under vacuum and sealing the intermediate space.

34 Claims, 3 Drawing Figures

METHOD OF PRODUCING A THERMALLY INSULATED BODY

BACKGROUND OF THE INVENTION

The present invention broadly relates to a method of fabricating a thermally insulated body and, more specifically, pertains to a new and improved method for fabricating a thermally insulated body, e.g. a pipe, having an inner shell and an outer shell, particularly a metallic inner shell and a metallic outer shell.

The thermal insulation of bodies is principally undertaken for two reasons, either to inhibit the heat losses of a medium or to prevent a thermal loading or stressing, for example of the outer shell of a container. A vacuum is the ideal thermal insulation against heat transmission or conduction; a layer or film reflecting infrared rays is suitable against heat radiation.

A thermally insulated body is known from the European Pat. No. 17,095, published Oct. 10, 1980, which comprises an outer shell and an inner shell. The intermediate space formed between both shells is maintained under vacuum and is filled with powdered porous material, e.g. activated charcoal or siliceous earth. This body is fabricated by first filling the intermediate space with the powdered insulating material and thereafter evacuating and then sealing. This procedure is particularly slow, since both the gas filling the intermediate space and the gas contained in the porous particles must be evacuated.

In order to avoid these disadvantages, the German Patent Publication No. 2,750,457, published June 22, 1978, proposes employing a gas with low thermal conductivity in place of the vacuum, which simultaneously produces the advantage that no long-term diminution of the thermal properties occurs.

A thermally insulated pipe is described in the German Patent Publication No. 2,333,933, published Jan. 24, 1974, which, among other things, comprises an inner shell and an outer shell forming an intermediate space which is filled with expanded perlite. A vacuum is obtained in the intermediate space by filling the intermediate space with carbon dioxide and relying on the temperature of the medium stored or transported in the insulated body, which is below the condensation temperature of carbon dioxide, to condense the carbon dioxide and in this manner generate a vacuum in the intermediate space. Such a thermally insulated body can, however, only function when the medium has a suitable temperature.

SUMMARY OF THE INVENTION

Therefore, with the foregoing in mind, it is a primary object of the present invention to provide a new and improved method for fabricating a thermally insulated double-shelled body which does not exhibit the aforementioned drawbacks and shortcomings of the prior art constructions.

Another and more specific object of the present invention aims at providing a new and improved method for the fabrication of a thermally insulated double-shelled body in which the intermediate space is filled with a porous thermal insulation material having a high absorption capacity for gases, thus permitting the vacuum in the intermediate space to be maintained for a long period of time by the absorptive properties of the insulation material and permitting simple, reliable and time-saving operation.

Yet another further significant object of the present invention aims at providing a new and improved method for fabricating a thermally insultated body of the character described which is relatively simple in concept, extremely economical to perform, highly reliable in execution, not readily subject to failure or malfunction and requires a minimum of attention.

Now in order to implement these and still further objects of the invention, which will become more readily apparent as the description proceeds, the method of the present invention for fabricating a thermally insulated body, e.g. tube, having an inner shell and an outer shell, in particular a metallic inner shell and a metallic outer shell, forming an intermediate space which is filled with a porous particulate and/or porous powdered insulating material, evacuated and hermetically sealed is manifested by the features that it comprises first evacuating the intermediate space between the inner and outer shell and then introducing the insulating material into the intermediate space maintained under vacuum from a reservoir maintained under vacuum and then sealing the intermediate space.

In other words, the method of the present invention is manifested by the features that it comprises the steps of evacuating the intermediate space between the outer shell and the inner shell, maintaining the intermediate space under vacuum, introducing at least one of the porous particulate insulating material and the porous powdered insulating material from a reservoir maintained under vacuum into the intermediate space, and hermetically sealing the intermediate space.

Only a method of this type permits the circumvention of properties of the porous insulating material which hinder the filling of the intermediate space, namely the long-term emission of gas molecules, a phenomenon inherent to the high thermal insulation of the body because of the high absorptivity of the insulating material, and thereby to create a method which permits the fabrication of such thermally insulated bodies for industrial use. If no gas-emitting medium is disposed in the intermediate space, it can easily and quickly be evacuated and then the insulating material having already been substantially freed from gas molecules, introduced therein. The insulating material can, for instance, be evacuated in bulk or in a rotating drum and subsequently stored in an intermediate reservoir for filling the thermally insulated bodies. After the thus prepared insulating material has been introduced into the evacuated intermediate space, the latter can be immediately sealed to provide long-term assurance of the desired vacuum.

If the insulating material in the intermediate space is moved or agitated during filling, for instance opposite to and in the direction of filling, the formation of bridges or arches and the ensuing voids can be avoided.

In order to prevent the possible occurrence of electrostatic charges on the electrically non-conductive insulating material during filling, which would also produce voids, the inner and outer shells are electrically grounded before filling.

The most suitable monitoring of the desired degree of filling in the intermediate space is obtained when filling is terminated only after a prescribed quantity of the insulating material has been introduced. It has proven to be particularly practical to determine the prescribed quantity in terms of the weight of the material to be filled.

A particularly simple compaction of the insulating material in the intermediate space can be obtained by the action of gravity.

If the inner and outer shells are mutually connected at one end by a membrane before filling, stresses, for instance due to differing temperatures of the inner and outer shells and varying lengths in service, can be readily equalized or compensated.

If the intermediate space is filled with a warmed or heated insulating material, then the latter will have a particularly low gas content which enables the vacuum, after sealing of the intermediate space and cooling of the insulation material, to be further increased.

If the body to be filled is introduced into a filling chamber, then the already pre-evacuated insulating material can be particularly easily filled from a reservoir maintained under approximately the same vacuum as the chamber.

If the evacuated intermediate space filled with insulating material is sealed under vacuum by connecting the outer and inner shells with a fluid and/or pasty or tacky setting material and is subsequently further connected, e.g. by gluing, soldering or welding, then the method is particularly simple to execute.

If a thermoplastic material or a low-melt alloy is employed for the connection, then any danger of the sealant material emitting gases can be avoided.

In order to prevent or minimize the formation of a thermal bridge between the inner and outer shells, the thermoplastic material can be remelted after welding and then immediately distributed over the inner surface of the outer shell, e.g. by motion, in particular rotation of the body.

If the insulating material is uniformly distributed in the intermediate space after sealing, for instance in the case of a pipe by means of rotation about the longitudinal axis and shaking motions in the direction of the longitudinal axis, whereupon the inner shell is plastically deformed by the effect of pressure in its interior, then an optimal thermal insulation can be obtained. This is due to the complete filling of the intermediate space. Simultaneously a further deformation of the inner body, e.g. due to pressure effects, is avoided, since the inner body can transmit the force to the thermal insulating material and the latter to the more sturdy outer shell.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Describing now the drawings, it is to be understood that to simplify the showing thereof only enough of the structure of the apparatus for performing the method of the invention has been illustrated therein as is needed to enable one skilled in the art to readily understand the underlying principles and concepts of this invention.

Figure 1:
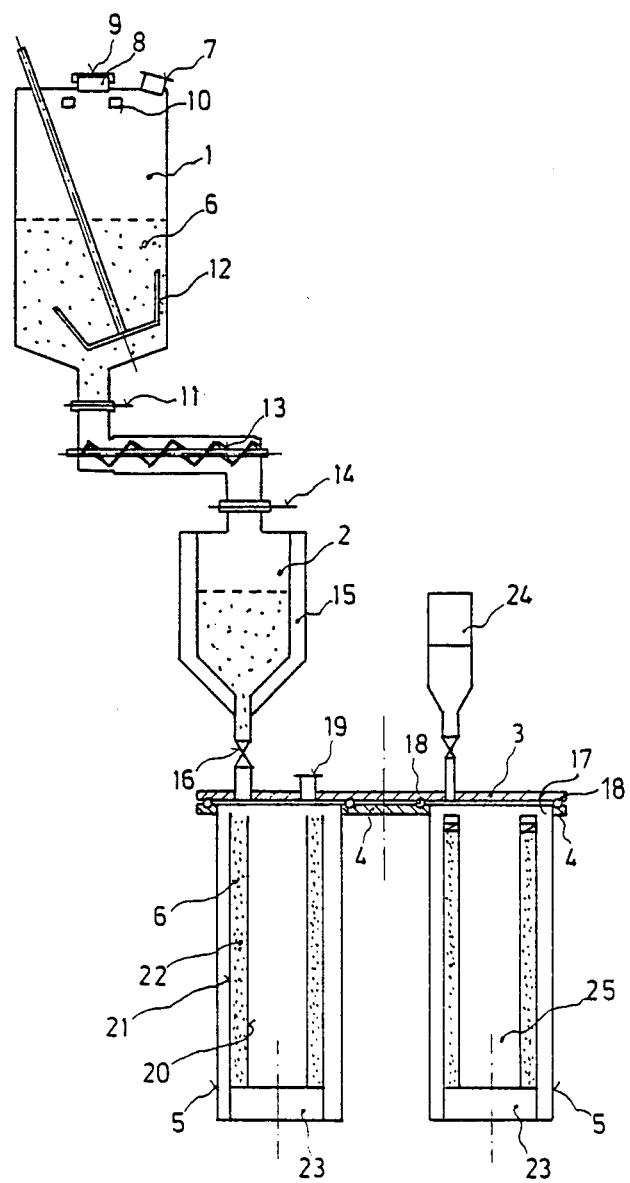
FIG. 1 schematically represents a device for performing the method of the invention.

Turning now specifically to FIG. 1 of the drawings, the apparatus illustrated therein by way of example and not limitation and employed to realize the method as hereinbefore described will be seen to comprise a reservoir 1 and an intermediate reservoir 2 for particulate insulating material. A receiver plate 3 is mounted beneath the intermediate reservoir 2 and a revolving plate 4 containing filling chambers or recipients 5 is mounted thereupon. The particulate or powdered porous insulating material 6 is stored in the reservoir 1. The reservoir 1 is connected to a not particularly shown vacuum pump by means of a port or opening 7. An infrared radiator 10 is mounted around a charge inlet port or opening 8 which can be hermetically sealed by a cover 9.

The particulate, powdered or fibrous insulating material 6, e.g. siliceous earth, activated charcoal, perlite, vermiculite, molecular sieves and the like, is introduced into the reservoir 1 which is closed-off by a sliding or gate valve 11. Then, the charge inlet port or opening 8 is sealed by the cover 9 and the gas is evacuated through the port 7. During evacuation, 9 stirring member 12 agitates the insulating material 6 and a heating effect is simultaneously produced by the infrared radiator 10. When the desired vacuum has been attained, which may be determined by means of a not particularly shown manometer, the sliding or gate valve 11 is opened and the insulating material 6 is transported by screw conveyor 13 through the opened sliding valve 14 into the intermediate reservoir 2.

The intermediate reservoir 2 is surrounded by a thermal insulation 15 in order to prevent a cooling of the insulating material 6. The intermediate reservoir 2 contains a sealing member 16 at its lower end which is connected to the fixed receiver plate 3 by means of a connecting stud. The revolving plate 4 is mounted on the fixed receiver plate 3 and contains four circular openings 17 in each of which the filling chambers or recipients 5 can be gas-tightly mounted. The openings 17 are each surrounded by an elastic gasket 18 providing a seal against the fixed receiver plate 3.

In a first, not particularly shown position, the filling chamber or recipient 5 is loaded with a hollow body 25 comprising metallic inner and outer shells 20 and 21 defining an intermediate space 22 to be filled, whereupon the recipient 5 is evacuated and thereby thermally insulated. The revolving plate 4 is then rotated 90° and the filling chamber or recipient 5 arrives in the position of the filling chamber or recipient illustrated in the left-hand side of FIG. 1. The filling chamber or recipient 5 is further evacuated through a port 19 and simultaneously the insulating material 6 is filled into the intermediate space 22 formed between the inner shell 20 and the outer shell 21.

During filling, the body 25 formed by the inner and outer shells 20 and 21 connected at one of their ends by a metallic membrane 26 of lesser thickness than the thicknesses of the pipes and which is in metallic contact with a grounded turning and vibrating table 23, is turned and is moved to-and-fro in the direction of filling. The table of the turning and vibrating table 23 simultaneously serves as the platform of an electrical or electronic weigh-scale. When the intermediate space 22 has been filled with the desired quantity of insulating material 6, which is determined by means of the increase in weight of the hollow body 25, the supply is interrupted and a further, already pre-evacuated filling chamber or recipient 5 arrives at the filling station by the rotation of the revolving plate 4 to which the filling chamber or recipients 5 are mounted. The filling chamber or recipient 5 containing the already filled hollow body 25 arrives at the position shown at the right of FIG. 1, where the hollow body 25 is rotated about its longitudinal axis and a thermoplastic material 30, e.g. polyvinylchloride free of plastifier stored in a reservoir 24 and which has been heated slightly above its melting point, is introduced into the upper end of the intermediate space 22. The thermoplastic material 30 hardens and produces a gas-tight seal 29 of the intermediate space 22. This filling chamber or recipients is then rotated into a further station where either the vacuum is released or a welding operation, e.g. an electron beam welding operation which introduces a very slight amount of heat, is carried out.

A preliminary seal can also be obtained with a welded insert cover which is hydraulically wrapped and thereby sealingly mounted. The welding operation can then take place at ambient pressure.

Figure 2:
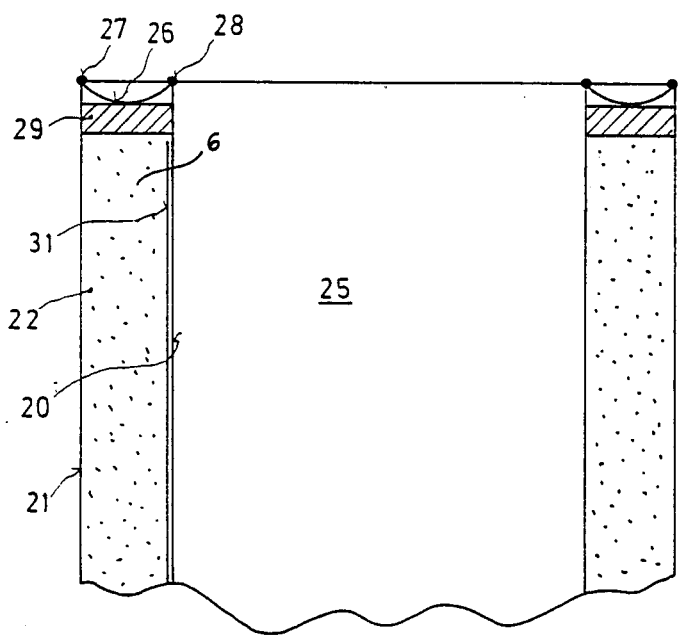
FIGS. 2 and 3 show the sealed end of an insulated body in cross-section.
Figure 3:
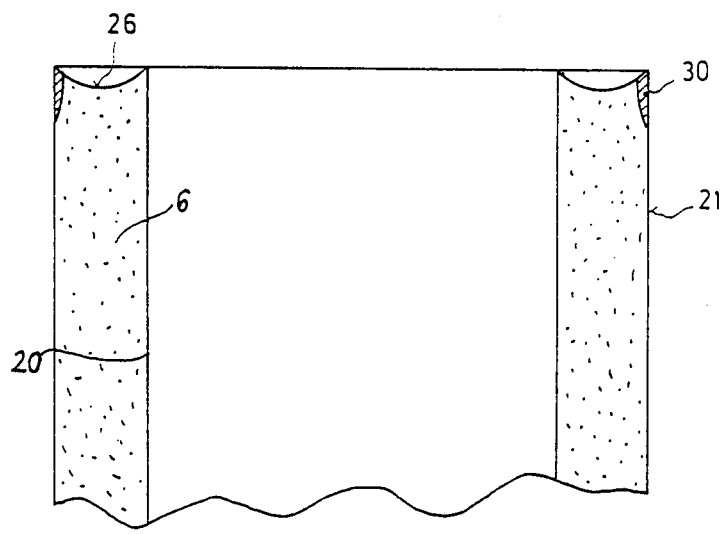

As can be seen from FIG. 2, a spherical or semi-toroidal ring, e.g. a membrane 26, can be employed to connect the inner shell 20 and the outer shell 21 of the hollow body 25. This membrane 26 is connected to the respective shell 20 or 21 by welded seams or joints 27 and 28. The seal 29 formed by the thermoplastic material 30 can be seen beneath the membrane 26. If the hollow body 25 is now heated above the melting point of the thermoplastic material and is rapidly rotated about its longitudinal axis, then the thermoplastic material 30 distributes itself about the inner surface of the outer shell 21 as is indicated in FIG. 3. If the particulate insulating material 6 is now distributed into the space originally occupied by the seal 29, e.g. by means of vibration, whereupon the inner shell 20 plastically deforms in the direction of the outer shell 21 due to pressure effects, then a thermally insulated hollow body 25 is obtained which only comprises a subordinate or minor thermal bridge formed by the thin membrane 26.

Typical examples of thermally insulated bodies 25 which can be fabricated according to the method of the invention are pipes for remote heating conduits or for super-cooled liquids and gases. A further field of application is that of thermal storage units, in particular latent heat storage units, where the good insulating properties permit a broad field of application, e.g. in solar heat. Metallic materials, particularly steel, have proven to be suitable as a material for the inner and outer shells 20 or 21 as well as the membrane 26. An infrared radiation shield can be created either by polishing the surfaces of the pipes or by providing a separate infrared shield, e.g. an aluminum foil 31, such as is represented in the left-hand half of FIG. 2.

While there are shown and described present preferred embodiments of the invention, it is to be distinctly understood that the invention is not limited thereto, but may be otherwise variously embodied and practiced within the scope of the following claims. Accordingly,

What we claim is:

1. A method for fabricating a thermally insulated body, especially a pipe, having an inner shell and an outer shell, especially a metallic inner shell and a metallic outer shell, defining a hermetically sealed intermediate space filled with at least one of a porous particulate insulating material and a porous powdered insulating material under vacuum, comprising the steps of:
    evacuating the intermediate space between the outer shell and the inner shell;
    maintaining the intermediate space under vacuum;
    introducing at least one insulating material of the porous particulate insulating material and the porous powdered insulating material from a reservoir maintained under vacuum into the intermediate space between the outer shell and the inner shell;
    electrically grounding the inner shell and the outer shell before performing said step of introducing said at least one insulating material; and
    hermetically sealing the intermediate space.

2. The method as defined in claim 1, further including the step of:
    mechanically agitating said at least one insulating material in the intermediate space during said step of introducing said at least one insulating material.

3. The method as defined in claim 2, wherein:
    said step of introducing said at least one insulating material is performed in a direction of filling; and
    said step of mechanically agitating said at least one insulating material is performed in a direction extending substantially parallel to said direction of filling.

4. The method as defined in claim 1, further including the step of:
    terminating said step of introducing said at least one insulating material after a prescribed quantity of said at least one insulating material has been introduced.

5. The method as defined in claim 4, wherein:
    said prescribed quantity of said at least one insulating material is a prescribed weight of said at least one insulating material.

6. The method as defined in claim 1, further including the step of:
    connecting the inner shell and the outer shell together by a membrane at one end before performing said step of introducing said at least one insulating material.

7. The method as defined in claim 1, further including the step of:
    heating said at least one insulating material before performing said step of introducing said at least one insulating material.

8. The method as defined in claim 1, further including the step of:
    compacting said at least one insulating material in the intermediate space by the action of gravity.

9. The method as defined in claim 1, further including the step of:
    hermetically connecting the inner shell and the outer shell together after performing said step of introducing said at least one insulating material.

10. The method as defined in claim 9, wherein:
    said step of hermetically connecting the inner shell and the outer shell together is performed by welding.

11. The method as defined in claim 1, further including the step of:
    introducing the inner shell and the outer shell into a filling chamber for performing said step of introducing said at least one insulating material.

12. The method as defined in claim 1, wherein:
    said step of hermetically sealing the intermediate space is performed under vacuum; and said step of hermetically sealing the intermediate space entails the further step of connecting the inner shell and the outer shell together with a setting material and the still further step of subsequently additionally connecting the inner shell and the outer shell together by a bonding agent.

13. The method as defined in claim 12, wherein:
said setting material is thixotropic.

14. The method as defined in claim 12, wherein:
said setting material is fluid.

15. The method as defined in claim 12, wherein:
said setting material is thermoplastic.

16. The method as defined in claim 12, wherein:
said setting material is a low-melt alloy.

17. The method as defined in claim 12, wherein:
said bonding agent is a weld joint.

18. The method as defined in claim 12, wherein:
said bonding agent is an adhesive.

19. The method as defined in claim 12, wherein:
said bonding agent is solder.

20. The method as defined in claim 15, further including the step of:
melting said thermoplastic setting material after performing said still further step of additionally connecting the inner shell and the outer shell together by a bonding agent.

21. The method as defined in claim 16, further including the step of:
melting said low-melt alloy after performing said still further step of additionally connecting the inner shell and the outer shell together by a bonding agent.

22. The method as defined in claim 20, further including the step of:
distributing said molten thermoplastic setting material over an inner surface of the outer shell by motion.

23. The method as defined in claim 20, further including the step of:
distributing said molten thermoplastic setting material over an inner surface of the outer shell by rotation of the inner shell and the outer shell.

24. The method as defined in claim 20, comprising the steps of:
connecting the inner shell and the outer shell together by a membrane at one end before performing said step of introducing said at least one insulating material; and
distributing said molten thermoplastic setting material over said membrane by motion.

25. The method as defined in claim 20, comprising the steps of:
connecting the inner shell and the outer shell together by a membrane at one end before performing said step of introducing said at least one insulating material; and
distributing said molten thermoplastic setting material over said membrane of by rotation of the inner shell and the outer shell.

26. The method as defined in claim 20, further including the step of:
distributing said molten thermoplastic setting material over an outer surface of the inner shell by motion.

27. The method as defined in claim 20, further including the step of:
distributing said molten thermoplastic setting material over an outer surface of the inner shell by rotation of the inner shell and the outer shell.

28. The method as defined in claim 21, further including the step of:
distributing said molten low-melt alloy over an inner surface of the outer shell by motion.

29. The method as defined in claim 11, further including the step of:
distributing said molten low-melt alloy over an inner surface of the outer shell by rotation of the inner shell and the outer shell.

30. The method as defined in claim 21, further including the steps of:
connecting the inner shell and the outer shell together by a membrane at one end before performing said step of introducing said at least one insulating material; and
distributing said molten low-melt alloy over said membrane of by motion.

31. The method as defined in claim 21, further including the steps of:
connecting the inner shell and the outer shell together by a membrane at one end before performing said step of introducing said at least one insulating material; and
distributing said molten low-melt alloy over said membrane by rotation of the inner shell and the outer shell.

32. The method as defined in claim 21, comprising the step of:
distributing said molten low-melt alloy over an outer surface of the inner shell by motion.

33. The method as defined in claim 6, further including the step of:
distributing said molten low-melt alloy over an outer surface of the inner shell by rotation of the inner shell and the outer shell.

34. The method as defined in claim 1, further including the steps of:
uniformly distributing said at least one insulating material in the intermediate space after performing said step of hermetically sealing the intermediate space; and
plastically deforming the inner shell by action of an internal pressure thereof.

* * * * *